United States Patent [19]

Jansen

[11] Patent Number: 5,746,418
[45] Date of Patent: May 5, 1998

[54] RETARDATION SYSTEM FOR REDUCING THE SPEED OF A MOVING OBJECT

[76] Inventor: Arie Jansen, Gaardedreef 33, Zoetermeer, Netherlands, 2733 AK

[21] Appl. No.: 682,527

[22] PCT Filed: Jan. 20, 1995

[86] PCT No.: PCT/NL95/00029

§ 371 Date: Sep. 19, 1996

§ 102(e) Date: Sep. 19, 1996

[87] PCT Pub. No.: WO95/20112

PCT Pub. Date: Jul. 27, 1995

[30] Foreign Application Priority Data

Jan. 21, 1994 [NL] Netherlands ............................ 9400105

[51] Int. Cl.⁶ .................................................. F16M 1/00
[52] U.S. Cl. ........................... 267/136; 188/381; 188/371; 267/158
[58] Field of Search ............................... 188/371, 129, 188/381; 267/136, 139, 195, 158, 160, DIG. 3, 196

[56] References Cited

U.S. PATENT DOCUMENTS

| | | | |
|---|---|---|---|
| 4,014,565 | 3/1977 | Fieni | 188/371 X |
| 4,515,845 | 5/1985 | Annis | 188/381 X |
| 5,382,008 | 1/1995 | Tyutinman | 267/136 X |

FOREIGN PATENT DOCUMENTS

| | | | |
|---|---|---|---|
| 810541 | 4/1969 | Canada | 367/136 |
| 2-95951 | 6/1990 | Japan. | |
| 813023 | 3/1981 | U.S.S.R. | 267/136 |

*Primary Examiner*—Peter M. Poon
*Attorney, Agent, or Firm*—Welsh & Katz, Ltd.

[57] ABSTRACT

A retardation system for adjustably reducing the speed of an object moving relative to the retardation system. The retardation system comprises a retardation mechanism to which is transferred the kinetic energy of the object when the speed of the object is being reduced by the retardation mechanism, and a computing device for computing the kinetic energy to be transferred to the retardation mechanism in the form of retardation forces, calculated over time, of the object during its retardation process. According to the invention, the retardation mechanism comprises a frame with a retaining device for removably and slidably receiving in the retaining device one of the ends of at least one force-absorbing element, the plane of this element extending at an angle relative to the axis of the frame, and the at least one force-absorbing element being slidable by its other free end in the plane of the element relative to the axis of the frame, in such a manner that the object, of which the relative direction of motion is generally aligned with the axis of the frame, while passing the at least one force-absorbing element, is in a predetermined effective contact with the other free end of this force-absorbing element, the amount of the contact between the object and the force-absorbing element being a measure for the magnitude of the kinetic energy to be transferred to the at least one force-absorbing element.

12 Claims, 5 Drawing Sheets

RETARDATION SYSTEM FOR REDUCING THE SPEED OF A MOVING OBJECT

This invention relates to a retardation system for adjustably reducing the speed of an object moving relative to the retardation system, which retardation system comprises a retardation mechanism for transferring to this retardation mechanism the kinetic energy of the object when the speed of the object is being reduced by the retardation mechanism, and a computing device for computing the kinetic energy to be transferred to the retardation mechanism in the form of retardation forces, calculated over time, of the object during its retardation process.

JP-A-209-5951 describes such a retardation system for retarding a moving object by means of hydraulic shock absorbers. Also other specific constructions for this purpose are known. Thus, for instance, in impact tests with cars or in testing car components, retardation systems are used in the form of, for instance, crushable elements which deform plastically. Also used frequently are linear and non-linear spring systems. All these known retardation systems have certain drawbacks.

When crushable elements are used, for instance in testing cars or parts of the body/chassis, these crushable elements have to be replaced after each impact event, which requires time and material. Moreover, the reproducibility of crushable elements is generally poor. This means that several impact tests are needed to produce the desired retardation characteristic of braking power versus time, and is therefore time-consuming. Also, the composition of the crushable elements plays a role. If so-called "honeycomb" crushable elements are used, it happens that as a result of the manufacturing process of the "honeycomb" the deformation force or the energy absorption varies strongly among from one manufactured product to another, which makes it very difficult to establish the retardation characteristic.

Another drawback of crushable elements is that highly variable, i.e. rapidly increasing and decreasing, retardation forces cannot be realized, because in principal crushable elements can only be compressed. A strong decrease in the retardation force implies that the deformation force must suddenly become lower, which is unusual for crushable elements because they produce a more or less constant force along the path of deformation.

Yet another drawback is that the crushable elements are generally based on the buckling behavior of the material used and the design thereof. As a consequence, in particular the height or length of such a crushable element is limited and so a great retardation force of long duration is very difficult to realize, if at all.

A number of the above-mentioned drawbacks can be obviated by using controlled or non-controlled hydraulic shock absorbers, since these shock absorbers make it possible to generate within certain limits a varying force or retardation characteristic, which changes with the distance traveled or with time. However, a number of drawbacks are associated with this hydraulic system.

For instance, the adjustability there of is difficult and limited and mostly requires empirical determination. Moreover, for different retardation characteristics, different shock absorbers have to be used or the control must be adjusted. Further, controlled hydraulic dampers are typically too slow for short-lasting highly varying shock loads. In particular for large masses, hydraulic dampers become too slow, too heavy and expensive.

Linear and nonlinear spring systems are relatively simple and are therefore frequently employed for braking cranes and trains, for instance, or for wheel suspension or automobiles in combination with a shock absorber. However, these simple spring systems also have a number of drawbacks.

One of these drawbacks is that a spring system, upon impact of an object, stores a part of the impact energy and, upon compression and/or extension of the spring system, restores part of it to the object. As a result, the velocity of motion of the object increases again, but now in the direction opposite to its original direction. Although there are spring systems which no longer rebound upon impact of an object, they have as a disadvantage that the force continues to act on the object. Moreover, these spring systems often have the drawback that they are highly speed-dependent and the kinetic energy of the object transferred to the spring system can only be determined highly inaccurately. In addition, such a spring system mostly has a uniform course along a certain path of compression or extension and cannot produce highly variable retardations.

The object of the invention is to obviate the above-mentioned drawbacks and to provide a retardation system by means of which any desired retardation characteristic can be set, so that an object can be retarded over very short distances but also over indefinitely long distances, whereby all kinetic energy can be transferred to the retardation system, and the braking procedure can be repeated directly and many times, without requiring replacement of any parts and without the object sustaining any undue damage, and the test can be carried out very simply and reliably.

This object is realized, according to the invention, in that the retardation mechanism comprises a frame with a retaining device for removably and slidably receiving in the retaining device one of the ends of at least one force-absorbing element, the plane of this element extending at an angle relative to the axis of the frame, and the at least one force-absorbing element being slidable by its other free end in the plane of the element relative to the axis of the frame, in such a manner that the object, of which the relative direction of motion is generally aligned with the axis of the frame, while passing the at least one force-absorbing element, is in a predetermined effective contact with the other free end of this force-absorbing element, the amount of the contact between the object and the force-absorbing element being a measure for the magnitude of the kinetic energy to be transferred to the at least one force-absorbing element.

The achievement of the invention is that virtually any retardation characteristic can be obtained in a simple manner. In fact, according to the invention, the retardation characteristic can be adjusted in that the at least one force-transmitting element is slidably mounted. In a particular embodiment, the adjustment of the retardation characteristic can be further improved in that, according to the invention, in the retaining device, viewed in the object's direction of motion, which is generally aligned with the axis, at least a first number of force-absorbing elements disposed behind each other are removably and slidably mounted.

Preferably, a number of retaining devices, each comprising force-absorbing elements disposed behind each other, are arranged in the frame and spatially positioned around the axis of the frame, these force-absorbing elements being disposed parallel to each other or a number of them at different angles relative to each other, and spacers are arranged between these force-absorbing elements to keep the force-absorbing elements at the same distance or at different distances from each other, these spacers further being slidable along the force-absorbing elements for the purpose of adjusting the spring force.

By providing the object, in accordance with the invention, with a braking body which is coupled with the object in such a manner that exclusively the braking body coupled to the object is in effective contact with the force-absorbing elements of the retardation mechanism, the object can be prevented from coming into contact with the force-absorbing elements during its retardation process.

Moreover, the use of a braking body has additional advantages because the braking body can be given such geometric shapes that while such braking body passes a force-absorbing element, this element, depending on the speed of the braking body with the object, is in contact with the braking body for a predetermined period of time. The duration of such contact between a particular element and the specific geometric shape of the braking body partly influences the magnitude and duration of the retardation characteristic.

The invention will be explained hereinafter in more detail on the basis of a few illustrative embodiments and with reference to the drawings. In the drawings FIG. 1 is a longitudinal sectional view showing a first exemplary embodiment of the retardation system comprising a retardation mechanism and a braking body which is coupled with an object through a rigid connection and which is just entering the retardation mechanism;

Figure 1:
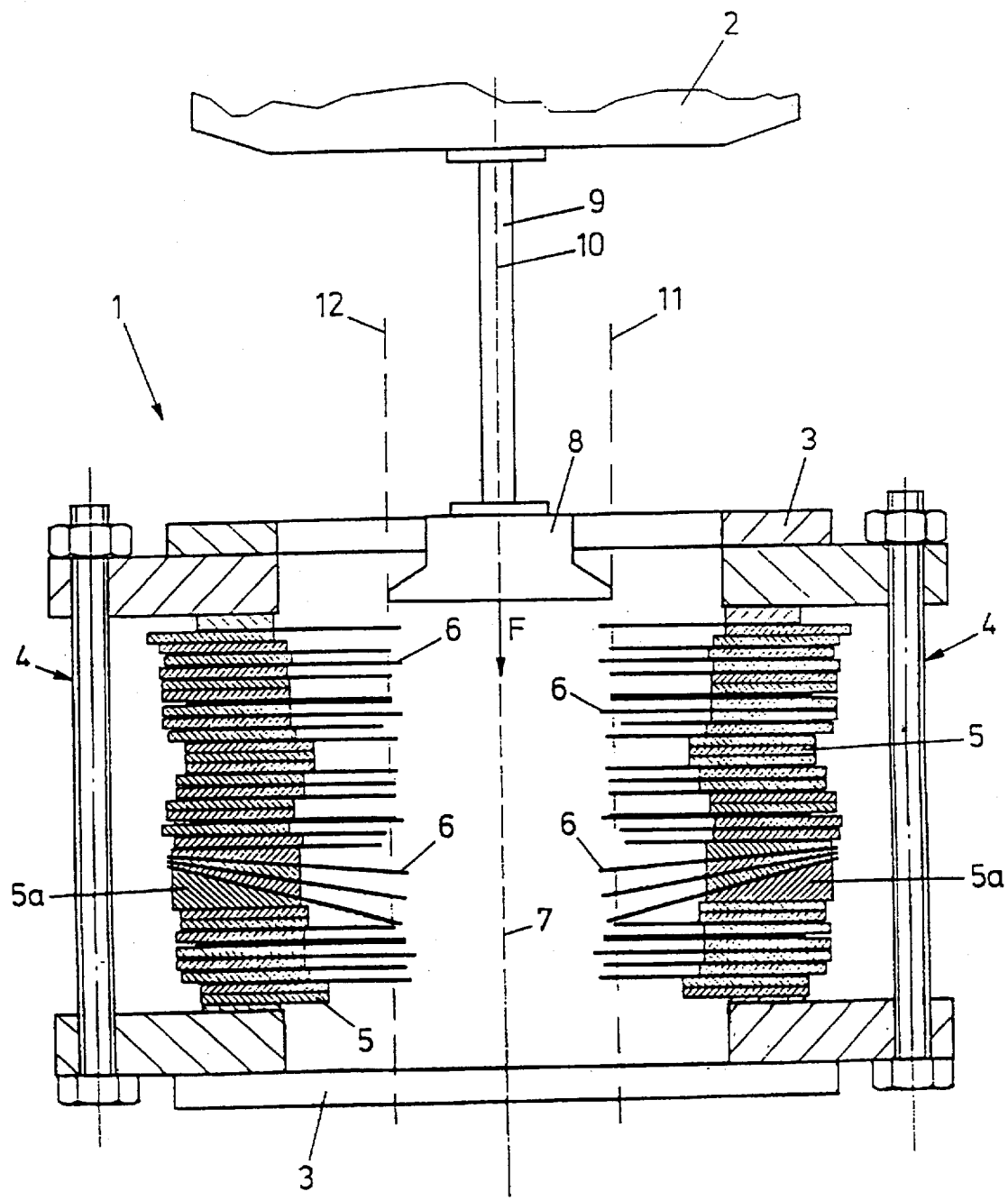
Figure 2:
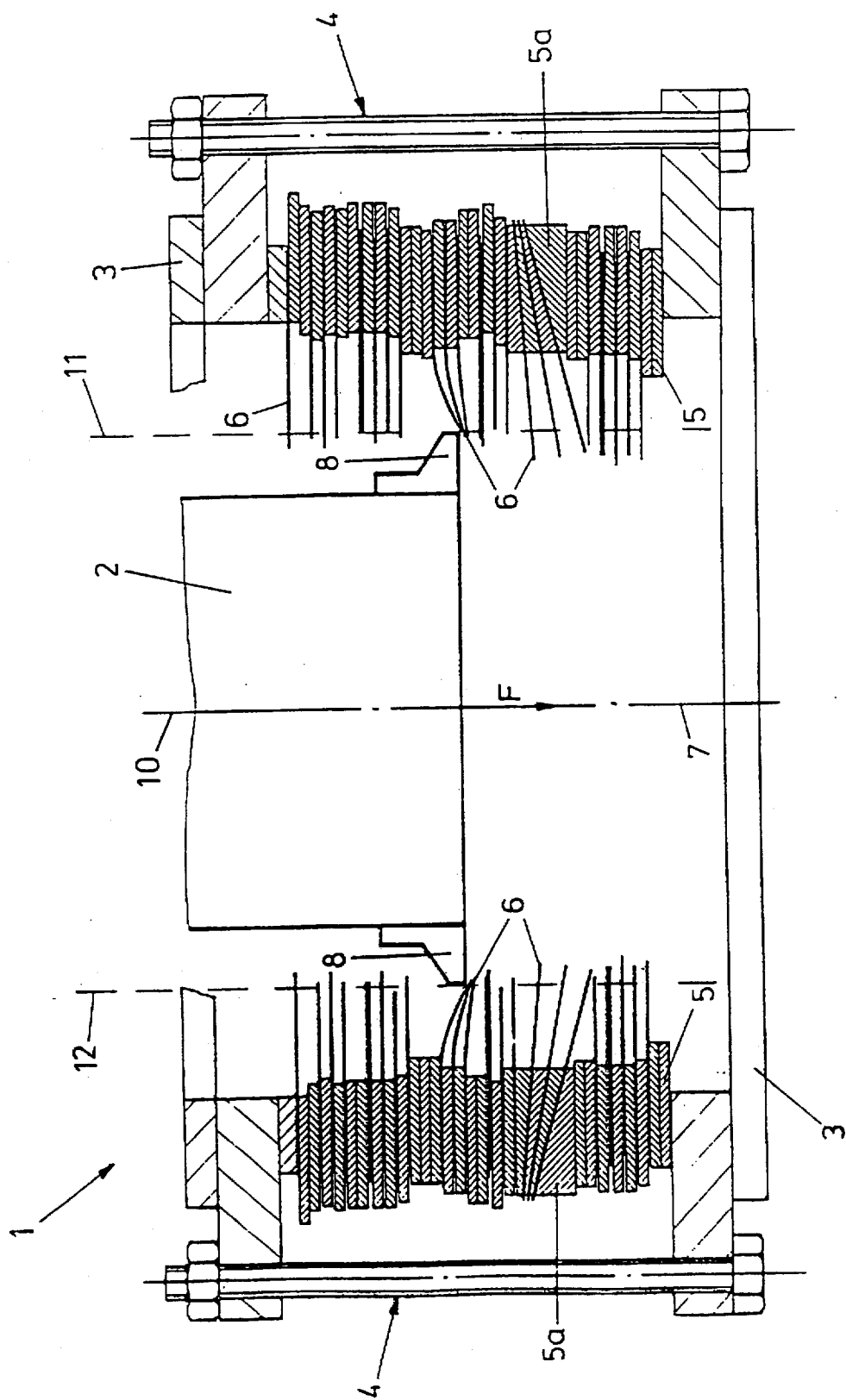
FIG. 2 shows the exemplary embodiment of FIG. 1 but now the braking body is coupled directly to the object and is located in the retardation mechanism.

The exemplary embodiment of the retardation system shown in FIGS. 1 and 2 consists of a retardation mechanism 1 for: transferring thereto the kinetic energy of an object 2 to be measured, the speed of which is to be reduced within a particular distance in the retardation mechanism 1, and a computing device (not shown), which can be coupled to the retardation mechanism 1, for computing the kinetic energy to be transferred to the retardation mechanism 1 in the form of retardation forces, calculated over time, of the object 2 during its retardation process. The retardation mechanism 1 comprises a frame 3 with a retaining device 4 for retaining therein a number of stacked spacers 5 between which spacers 5 one of the ends of, for instance, a leaf spring 6 is clamped. These spacers 5 with the leaf springs 6 clamped between them are so designed that the free ends of the leaf springs 6 in their inoperative position are disposed at a particular angle relative to the axis 7 of the frame 3. As appears from FIG. 1, this angle may for instance be 90° but any other angle is possible.

The spacers 5 also serve to make the distance between the leaf springs 6 greater or smaller or serve as filler elements to give the retaining device a desired height. By giving the spacers 5 specific shapes, the leaf springs 6 can be given different angles, if such is desired. See for instance the spacers 5a. By making the spacers 5 slidable, it is also possible to influence the effective length of the leaf springs 6.

Further, the leaf springs 6 can have various lengths and be slid together with the spacers 5 in the direction of the axis 7 or not. Also, the leaf springs can have various widths and/or thicknesses, which need not be the same throughout the length of the leaf springs.

Figure 3:
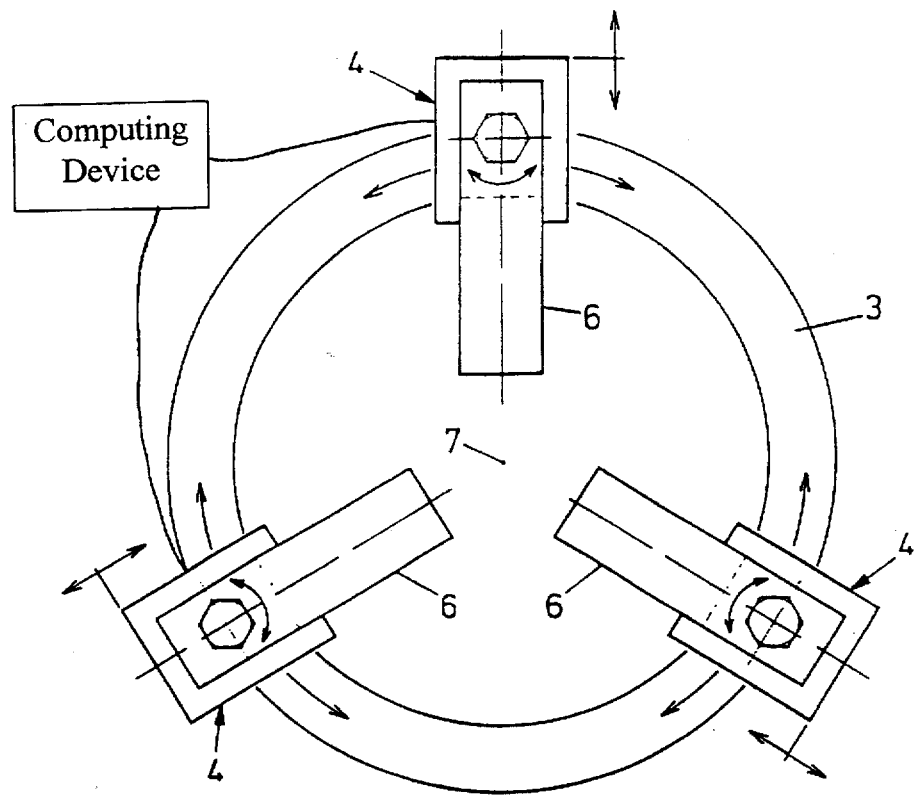
FIGS. 3–5 show different variations of a part of the embodiment of the retardation system of FIGS. 1 and 2, viewed in the direction of motion of the braking body with the object.
Figure 4:
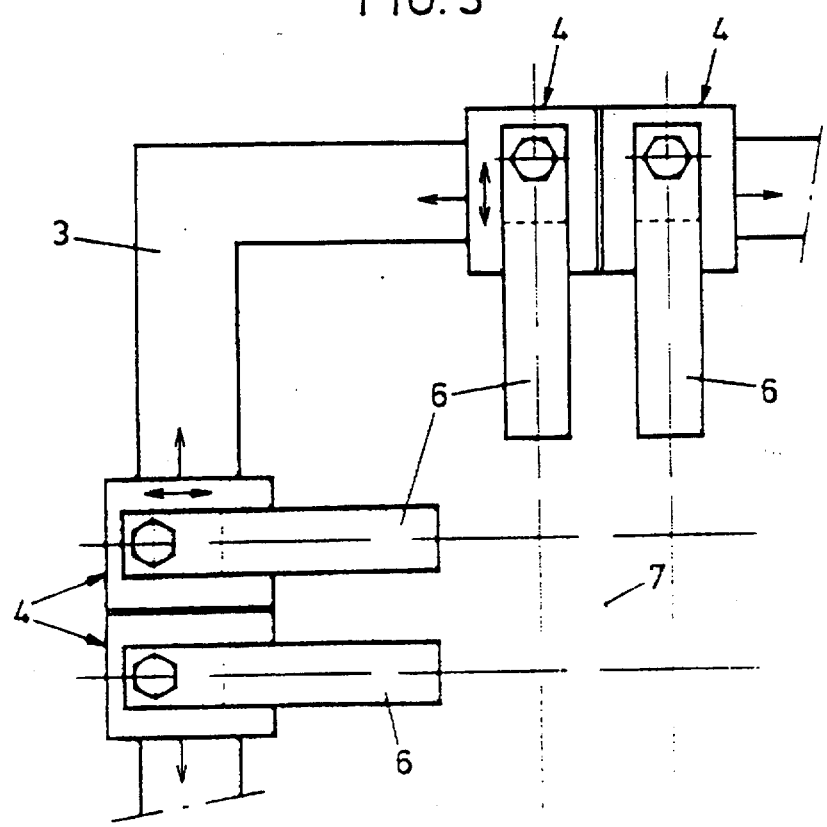

A number of the thus obtained units of spacers 5 and leaf springs 6 stacked in a retaining device can be accommodated in the frame 3 in different ways. For instance, the units can be positioned in pairs opposite each other in a plane, as shown in FIG. 1, or be spatially distributed at a relative angle of, for instance, 120°, as shown in FIG. 3. The units can also be grouped differently, for instance in two perpendicular planes, with several units side by side (see FIG. 4) or opposite to each other with several rows of units side by side (see FIG. 5). It will be clear that in addition to the above-mentioned configurations of the units many other configurations are possible.

To brake the object 2 to be measured, the object 2 to be measured will preferably be provided with a braking body 8. In the embodiment of FIG. 1, the braking body 8 is coupled to the object 2 to be measured, for instance a car, by means of a rigid connection, this braking body 8 being mounted on the object 2, in this case at the front of the object, in such a manner that exclusively the braking body traverses the retardation mechanism 1. To that end, this braking body 8 together with the object 2 is brought into a path such that, preferably, the axis 10 of the braking body 8 is in alignment with the axis 7 of the retardation mechanism 1, so as to bring the braking body 8, upon its entry of the retardation mechanism 1, into contact with the leaf springs 6.

To ensure that the leaf springs 6 do indeed contact the braking body 8, at least some of the free ends of the leaf springs should be disposed in the path of motion F of the braking body, i.e. within the lines 11 an 12 indicated in FIGS. 1 and 2.

Now, when the braking body 8 moves into the retardation mechanism 1, the braking body 8 will press down with some force the free end of the uppermost leaf spring 6 disposed in the path of motion F. The force which is exerted on the leaf spring 6 depends on the rigidity of the leaf spring 6 as well as on the extent to which the free end of the uppermost leaf spring 6 projects into the path of motion 11–12. The force necessary to deflect the leaf spring 6 acts in the opposite direction as a reaction force on the braking body 8 and hence on the object 2 to be measured, so that the object 2 decelerates. As long as the braking body moves further, the leaf spring 6 bands further, so that the reaction force increases. Beyond a certain point the free end of the leaf spring slips off the braking body 8, so that the reaction force on the braking body drops out. In this way the braking body, and hence the object 2, has transferred kinetic energy to this uppermost leaf spring. The transferred kinetic energy cannot be restored anymore since there is no contact between the leaf spring and the braking body anymore.

The braking body 8, if it has any fur her kinetic energy, will pass the consecutive leaf springs, each time transferring a part of the kinetic energy, until the braking body, and hence the object, has decelerated completely.

The braking body need not specifically be disposed at the front of, and spaced from, the object 2 in the manner indicated in FIG. 1 but can be arranged at any other point relative to the object. For instance, as shown in FIG. 2, the braking body 8, in this case divided in two parts, can the mounted directly on the sides of the object 2, that is, in such a manner that exclusively these partial braking bodies enter into contact with the leaf springs 6, without the object 2, in this variant also located in the retardation mechanism 1, coming into contact with these leaf springs 6.

In FIG. 2 it can be seen that during the braking process not only does the braking body 8 depress and release one leaf spring after the other before reaching a next leaf spring, but also several leaf springs 6 can be pressed against each other simultaneously, in other words several leaf springs 6 can cooperate with each other. For such cooperation, for instance one of the leaf springs needs to project into the path of motion 11–12, while a next leaf spring can remain outside the path of motion and yet cooperate in exerting a reaction force on the braking body 8. This is due to the fact that while the leaf spring projecting into the path of motion 11–12 is being depressed, it will come into contact with the next leaf spring, which does not project into the path of motion. It is clear that all this depends on the relative arrangement of the leaf springs 6. Further, it is clear that the duration of contact between one or more leaf springs and the braking body partly depends on the shape of the braking body and the speed of the object.

Thus, such a braking body 8 can have a trapezoidal shape as shown in FIGS. 1 and 2, the length of the upright sides determining the course and the duration of contact. Other shapes are possible as well, for instance a roof shape without upright sides. Basically, the braking body a can have any shape for the purpose of thereby regulating the necessary deflection of the leaf spring and the moment at which the contact between the braking body 8 and the leaf spring is broken. The amount of deflection of the leaf spring in conjunction with the shape of the leaf spring and the force required therefore can decrease and increase in a controlled manner through the design of the braking body, enabling the retardation force achieved to be influenced.

The leaf spring can also press against the side of the braking body, which, as long as the braking body moves, yields a certain retardation force which is partly dependent on the banding force present in the leaf spring.

The moment at which the leaf spring is no longer in contact with the braking body is determinative of the drop out of the retardation force which the braking body sustains from the leaf spring against the side of the braking body. The moment at which this force drops out is determined inter alia by the shape (length, width and/or thickness) of the braking body.

Figure 5:
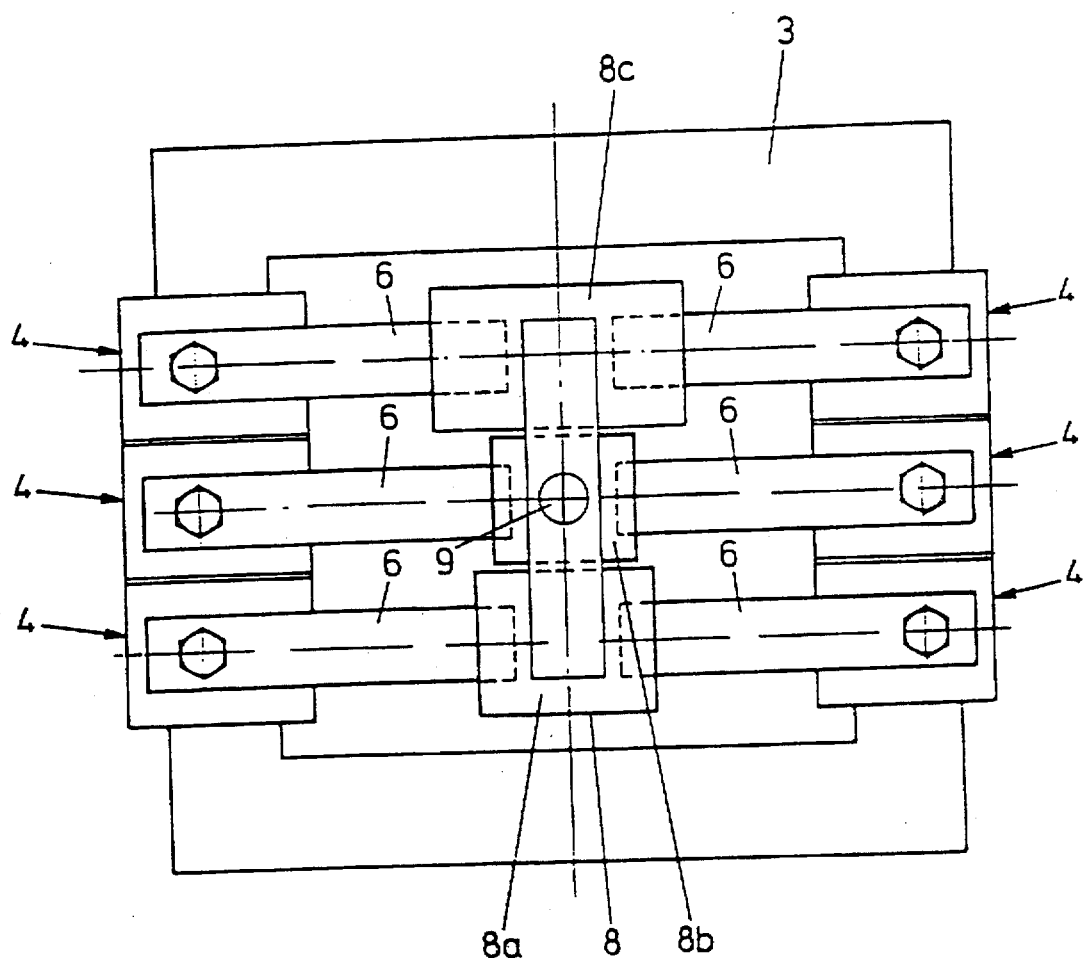

The braking body 8 of FIG. 5 as described above, can consist of a number of partial braking bodies 8a, b, and c coupled to each other. Thus, for instance, these partial braking bodies 8a, b, and c can be arranged side by side and cooperate with a corresponding number of units of superposed spacers 5 with leaf springs 6 stacked in a retaining device 4 (see FIG. 5). Optionally, these partial braking bodies can also be arranged one behind the other.

Also, if so desired, the braking body can make a rotary or other movement about one or more axes while passing the units 4, so that, for instance, a number of leaf springs which may or may not be identical and which may or may no be uniformly distributed, cooperate with that braking body in different ways, though in this care the braking body must have suitable geometry for the purpose.

Optionally, the force-absorbing elements 6 can be stacked in the retaining device 4 in such a manner that the direction of motion of the braking body 8 as it passes these elements is not rectilinear, but instead the braking body makes, for instance, a circular or back-and-forth movement.

During the braking process, it may be important that the braking body 8, and hence the object 2 to be measured, be subjected to different retardation forces within a certain distance. To realize this, it is possible, with the aid of the retardation mechanism, optionally in combination with a specific geometric design of the braking body, to make beforehand so-called retardation characteristics (see FIG. 6) of the object 2 to be retarded.

Figure 6:
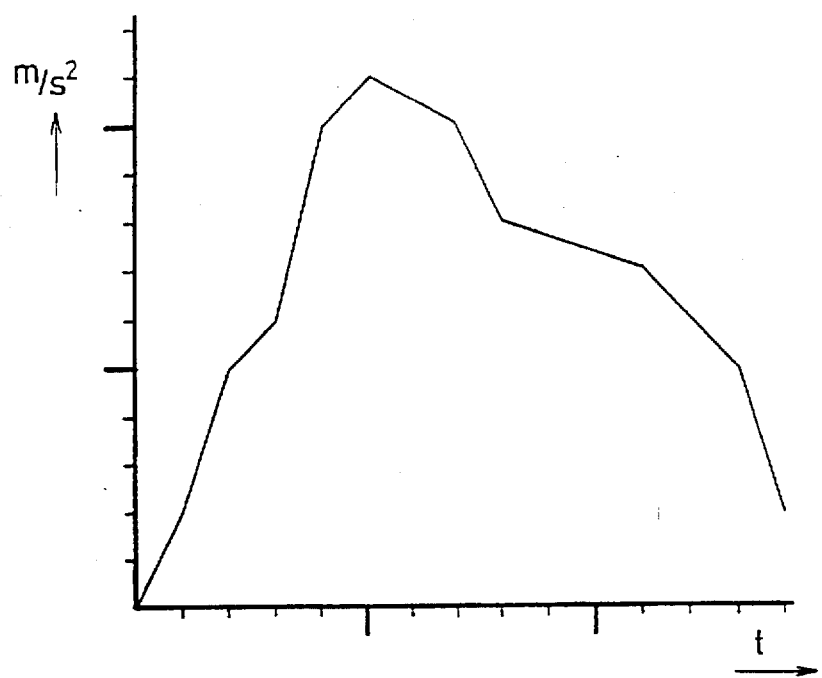
FIG. 6 shows a retardation characteristic of the course of the braking body along with the object through the retardation mechanism.

Such a retardation characteristic as shown in FIG. 6—the vertical axis indicates the retardation in $m/g^2$ and the horizontal axis indicates the time t in seconds—can simply be influenced by changing the effective length of the leaf springs or by placing the leaf springs at a different angle. The effective length of the leaf springs can for instance be influenced by shifting the spacers 5 between the leaf springs, or by changing the distance between the leaf springs by adding new spacers or by fitting different, thicker or thinner, spacers. It is also possible to shift the complete units 4 within the frame or to shift them in the direction of the axis of the frame or in the opposite directions or the units may be rotatable about their axis, for instance as indicated in FIG. 3. Through this simple operation, any desired retardation characteristic can be made, depending on the objective contemplated.

Figure 7:
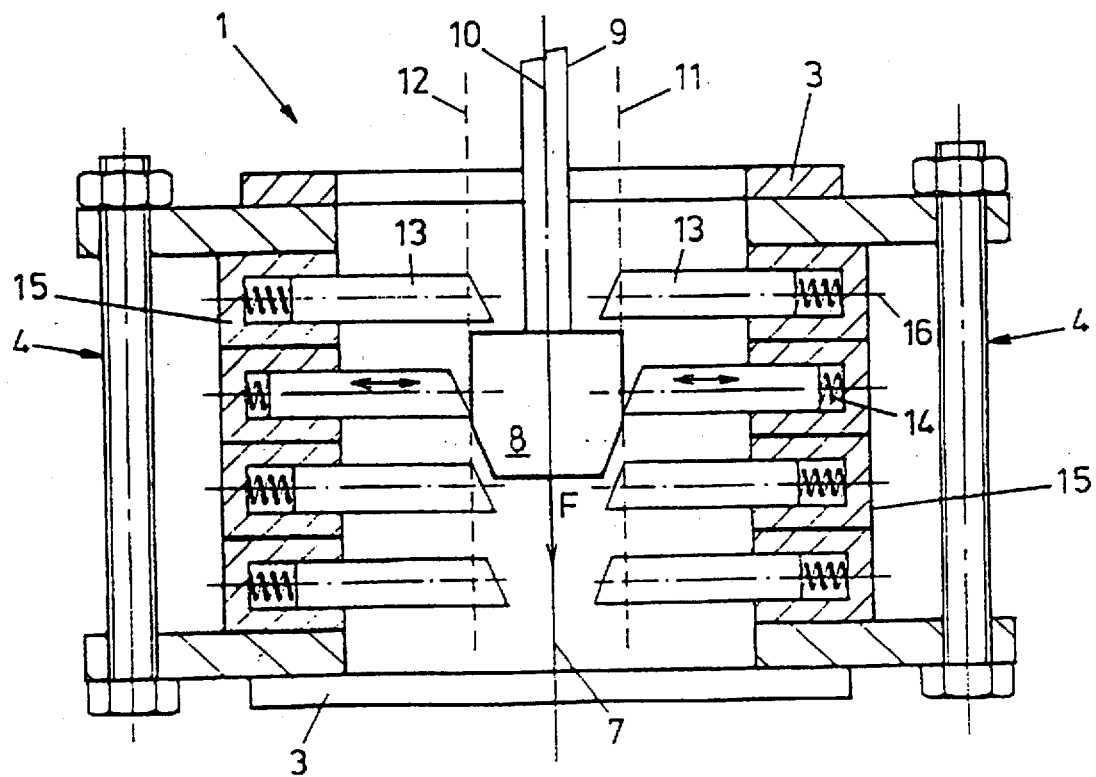
FIG. 7 is longitudinal sectional view showing a second exemplary embodiment of the retardation system.

FIG. 7 shows a second exemplary embodiment, which is identical to that of FIGS. 1 and 2 except that the leaf springs 6 with the spacers 5 of FIGS. 1 and 2 have be replaced with force-absorbing elements 13 which are each, by one end spring biased by a spring 14, removably and slidably mounted in a holder 15, which holders 15 are clampable in the clamping device 4 of FIGS. 1 and 2. The axis 16 of these force-absorbing elements 13 generally makes an angle of 90° with the axis 7 of the frame 3 but may also make different angles therewith.

The possibilities of this second exemplary embodiment correspond with those of the first embodiment given in FIGS. 1 and 2. In this second embodiment the force-absorbing elements 13 are not bent in the manner of the leaf spring 6 of FIGS. 1 and 2 but the force-absorbing elements are pressed into the holders against the pressure of the springs 14. By giving different spring characteristics to these springs 14, as well as by changing the length of the force-absorbing elements 13, this second embodiment too makes it possible to set any desired retardation characteristic.

In a particular embodiment, the force-absorbing elements 13 indicated in FIG. 7 can be replaced by springs, for instance by making the springs 14 of such length that the free ends of these springs 14 come to lie in the path of motion 11–12 of the braking body 8.

In general, the desired retardation characteristics according to the embodiment given, can be regulated with the aid of the computing device (not shown) and associated software. Also, with the same computing device and with sensors (not shown) provided on the force-transmitting elements 6, 14, it can be determined what the retardation characteristic is of an object 2 to be measured with a particular mass and speed during the deceleration process in the retardation mechanism 1.

Further, with the aid of the computing device and control mechanisms (not shown) the units 4 can be automatically shifted or rotated in the manner as shown, for instance, in FIG. 3, and also the force-absorbing elements 6, 13, the spacers 5 and the holders 15 can be displaced.

It is further noted that although it as been described hereinabove that the object 2 to be measured is preferably provided with a braking body 8, the object to be measured can also be braked directly in the retardation mechanism, without any braking body.

Although the invention has been described in essence hereinabove, it is clear that without departing from the scope of the invention, various modifications can be made. Thus, for instance, the retardation mechanism 1 can be coupled to the object 2, while the braking body 8 can be fixedly arranged as a separate unit, the object with the retardation mechanism then being moved to the braking body in such a manner that the force-absorbing elements come into contact with the braking body. It is clear that, conversely, the braking body can be moved to the fixedly arranged object with the retardation mechanism.

It is also possible that the retardation mechanism 1 forms an integral whole with the object 2 and that this whole moves to the separately and fixedly arranged braking body or that this whole and the braking body move relative to each other, or that the braking body moves to this integrated whole in order to bring the force-absorbing elements 6, 13, 14 into contact with the braking body 8.

I claim:

1. A retardation system for adjustably reducing the speed of an object moving relative to the retardation system, said retardation system comprising a retardation mechanism to which is transferred the kinetic energy of the object when the speed of the object is being reduced by the retardation mechanism said retardation mechanism comprising a frame with a retaining device for removably and slidably receiving in the retaining device a braking body containing one of the ends of a force-absorbing element, the plane of the element being mainly transverse with respect to an axis of the frame, and the force-absorbing element being slidable by its other free end in the plane of the element relative to the axis of the frame against said braking body for frictional contact therewith, in such a manner that the object having a relative direction of motion generally aligned with the axis of the frame through said braking body, while passing the force-absorbing element, is in a predetermined effective frictional contact with the other free end of this force-absorbing element, the amount of the frictional contact between the object and the force-absorbing element being a measure for the magnitude of the kinetic energy to be transferred to the force-absorbing element and said amount of contact in an overlapping radial area of a contact portion of the braking body and the other end of said force-absorbing element is given such that in a first position of movement of the braking body relative to said force-absorbing element no contact therebetween is given, in a second position of said movement contact is given, and in a third position no contact is given, the force-absorbing element being elastically deformed when being in contact with said contact portion of the object.

2. A retardation system according to claim 1, wherein the retaining device has at least a first number of force-absorbing elements disposed adjacent each other said force absorbing elements being removably and slidably mounted.

3. A retardation system according to claim 2, wherein a number of retaining devices, each comprising force-absorbing elements located behind each other, are arranged in the frame and spatially disposed about the axis of the frame.

4. A retardation system according to claim 2, wherein the force-absorbing elements are arranged parallel to each other.

5. A retardation system according to claim 2, wherein at least some of the force-absorbing elements can be disposed at different angles relative to another number of force-absorbing elements.

6. A retardation system according to claim 2, wherein between the force-absorbing elements in the retaining device a number of spacers slidable relative to the retaining device are arranged.

7. A retardation system according to claim 6, wherein the spacers are slidable in the plane of the force-absorbing elements for adjusting the bending stiffness of the force-absorbing elements.

8. A retardation system according to claim 2, wherein the force-absorbing elements are leaf springs.

9. A retardation system according to claim 2, wherein the force-absorbing elements are each, by one end under spring pressure, removably and slidably mounted in a holder, which holders can be fixed in the retaining device, while upon the passage of the object, the force-absorbing elements are slid into the holders against the spring pressure, the magnitude of the spring pressure being a measure for the transferred kinetic energy.

10. A retardation system according to claim 2, wherein the object comprises the braking body which is coupled to the object in such a manner that exclusively the braking body coupled to the object can be brought into effective contact with the force-absorbing elements of the retardation mechanism during the retardation process.

11. A retardation system according to claim 10 wherein the braking body can possess such geometric forms that while such braking body passes a force-absorbing element, this force-absorbing element is in contact with the braking body for a predetermined period of time, depending on the speed of the braking body with the object.

12. A retardation system according to claim 2, wherein the object comprises the retardation mechanism, which is coupled to the object in such manner that exclusively the force-absorbing elements of the retardation mechanism coupled to the object can be brought into effective contact with a braking body during the retardation process.

* * * * *